(12) United States Patent
Jameson

(10) Patent No.: US 8,950,448 B2
(45) Date of Patent: Feb. 10, 2015

(54) MULTI-FUNCTION TRANSFER DEVICE

(76) Inventor: J. Clint Jameson, Scottsdale, AZ (US)

(*) Notice: Subject to any disclaimer, the term of this patent is extended or adjusted under 35 U.S.C. 154(b) by 264 days.

(21) Appl. No.: 13/105,398

(22) Filed: May 11, 2011

(65) Prior Publication Data

US 2013/0000775 A1  Jan. 3, 2013

(51) Int. Cl.
- *B65B 1/04* (2006.01)
- *B67C 11/04* (2006.01)
- *G01F 19/00* (2006.01)
- *B67C 11/00* (2006.01)
- *B65B 1/36* (2006.01)

(52) U.S. Cl.
CPC ............... *B67C 11/04* (2013.01); *G01F 19/002* (2013.01); *B67C 2011/20* (2013.01); *B67C 2011/40* (2013.01); *B65B 1/36* (2013.01)
USPC ............ 141/344; 141/331; 141/339; 141/364

(58) Field of Classification Search
USPC ......... 141/331–334, 339–340, 344–345, 1, 2, 141/11, 363–366; 222/460–461
See application file for complete search history.

(56) References Cited

U.S. PATENT DOCUMENTS

| | | | | |
|---|---|---|---|---|
| 7,404 A | * | 2/1833 | Whitley | 141/344 |
| 343,871 A | * | 6/1886 | Van Kammen | 141/344 |
| 2,701,078 A | * | 2/1955 | Bowman | 141/321 |
| 2,794,457 A | * | 6/1957 | Nicodemus | 141/344 |
| 4,068,689 A | * | 1/1978 | Krull | 141/93 |
| 4,911,553 A | * | 3/1990 | Sawada et al. | 366/186 |
| 5,297,476 A | * | 3/1994 | Garland et al. | 99/495 |
| 6,035,907 A | * | 3/2000 | DeCoster | 141/331 |
| 7,191,773 B2 | * | 3/2007 | Vincent | 124/49 |
| 7,757,728 B2 | * | 7/2010 | Gruber | 141/201 |
| 8,522,840 B2 | * | 9/2013 | Houser | 141/358 |
| 2009/0120528 A1 | * | 5/2009 | Fisher et al. | 141/1 |

* cited by examiner

*Primary Examiner* — Timothy L Maust
*Assistant Examiner* — Timothy P Kelly
(74) *Attorney, Agent, or Firm* — The Noblitt Group, PLLC

(57) ABSTRACT

Various embodiments provide a multifunction transfer device, which can have: an open-ended conical portion having a larger diameter at a top open-end than at a bottom open-end; a release coupled to the bottom open-end of the conical portion and configured to move from a closed position to an open position; a rest integrated to a bottom of the release and configured to hold the device above a liquid container; and an open-ended chute coupled to the release below the rest and configured for fluid communication with the conical portion. In one embodiment, the multifunction transfer device can include at least one graduation configured to indicate a measurement of the material contained in a volume within the conical portion.

16 Claims, 10 Drawing Sheets

MULTI-FUNCTION TRANSFER DEVICE

BACKGROUND

A scoop is a well-known utensil, which can be used to move materials, such as, powders, liquids, and combinations thereof, from one location to another. In some applications, a scoop can be a specialized spoon. Scoops in the food service industry are typically related to ice cream or melon balls. However, shovel-style scoops have been developed for moving granules, such as, sugar or powder, such as, flour from one location to another. In some applications, a scoop may be graduated for measuring of a material that is being transferred. Although scoops have been known for a millennium, new applications demand improvements in this technology.

SUMMARY

Accordingly, various embodiments, disclosed herein, provide a multifunction transfer device, which can have: an open-ended conical portion having a larger diameter at a top open-end than at a bottom open-end; a release coupled to the bottom open-end of the conical portion and configured to move from a closed position to an open position; a rest integrated to a bottom of the release and configured to hold the device above a liquid container; and an open-ended chute coupled to the release below the rest and configured for fluid communication with the conical portion. In one embodiment, the multifunction transfer device can include at least one graduation configured to indicate a measurement of a material contained in a volume within the conical portion.

Various embodiments, disclosed herein, provide methods of use of a multifunction transfer device. In one embodiment, a method can include the steps of: scooping a portion of the material into the device; moving the device loaded with the material; coupling a bottom portion of the device into a mouth of a liquid container; releasing the portion of the material into the liquid container; and mixing the portion of the material with a liquid in the liquid container. In various embodiments, methods, disclosed herein, can be completed using only one hand.

Various embodiments provide a system for transferring a material for mixture with a liquid. In one embodiment, the system can include a multifunction transfer device and a lid configured to couple to an opening in the device and seal a material within the device.

BRIEF DESCRIPTION OF THE DRAWINGS

The present disclosure will become more fully understood from the detailed description and the accompanying drawings, wherein.

DETAILED DESCRIPTION

Figure 1:
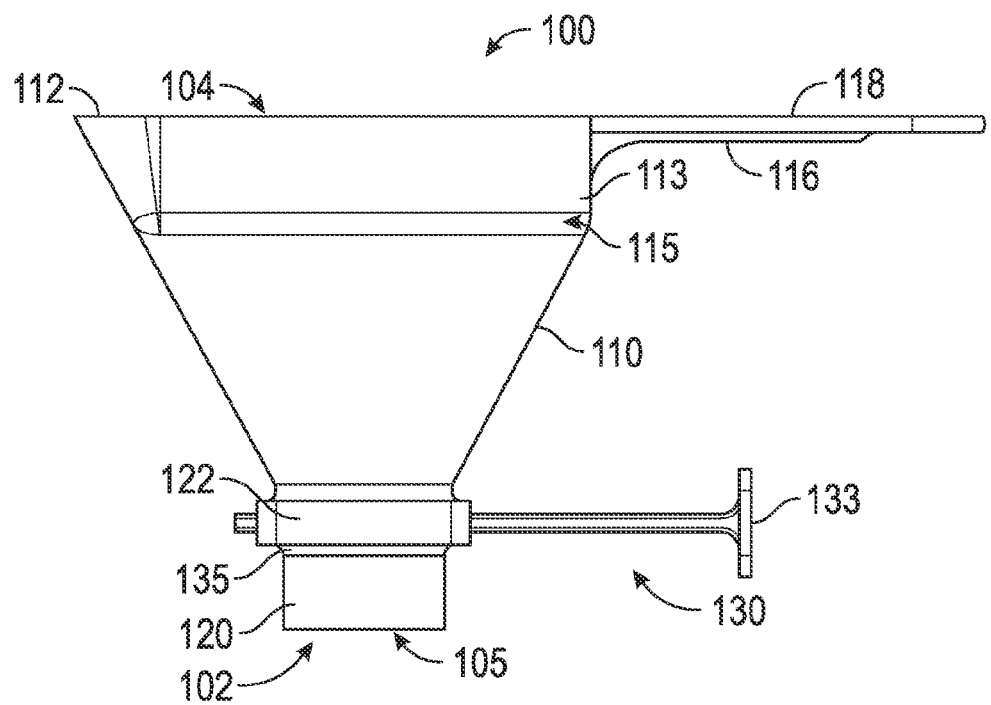
FIG. 1 is a side view illustrating a multifunction transfer device, in accordance with various embodiments.
Figure 2:
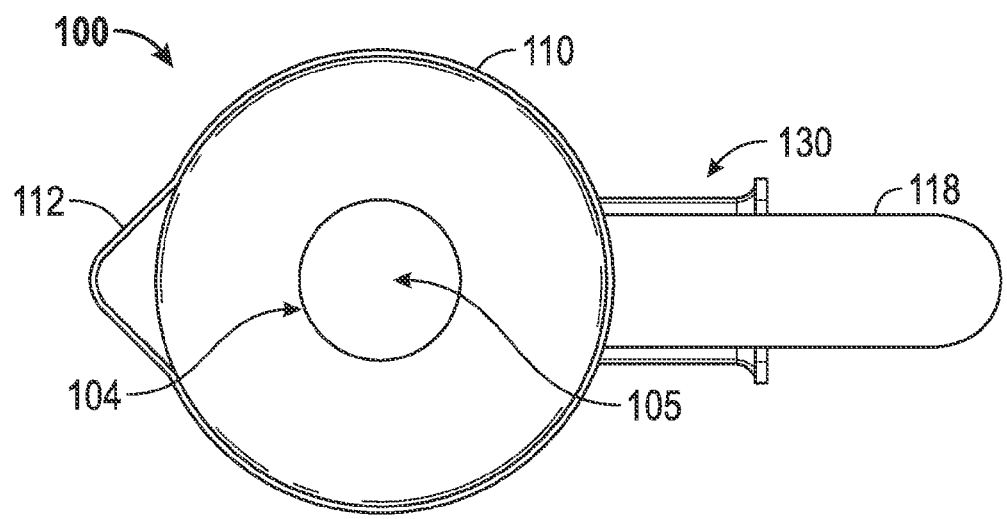
FIG. 2 is a top view illustrating a multifunction transfer device, in accordance with various embodiments.
Figure 3:
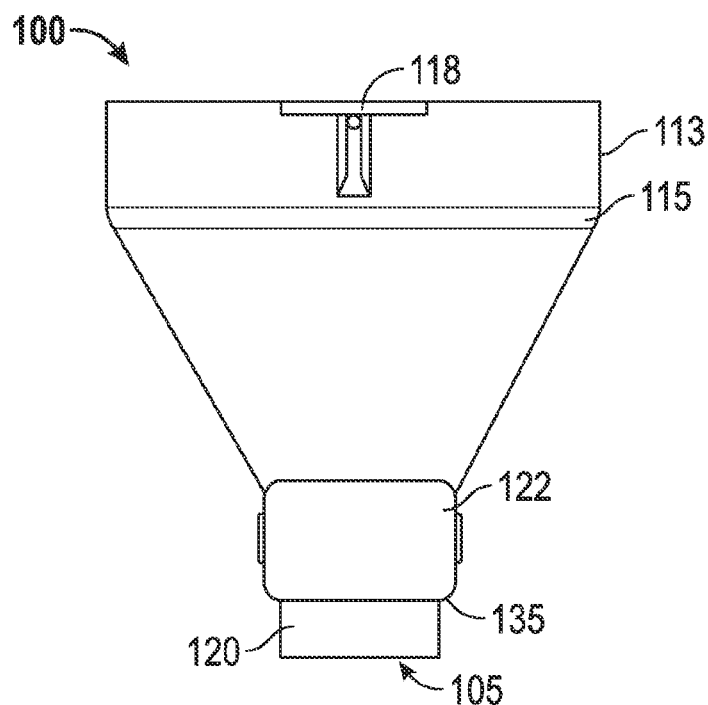
FIG. 3 is a front view illustrating a multifunction transfer device, in accordance with various embodiments.
Figure 4:
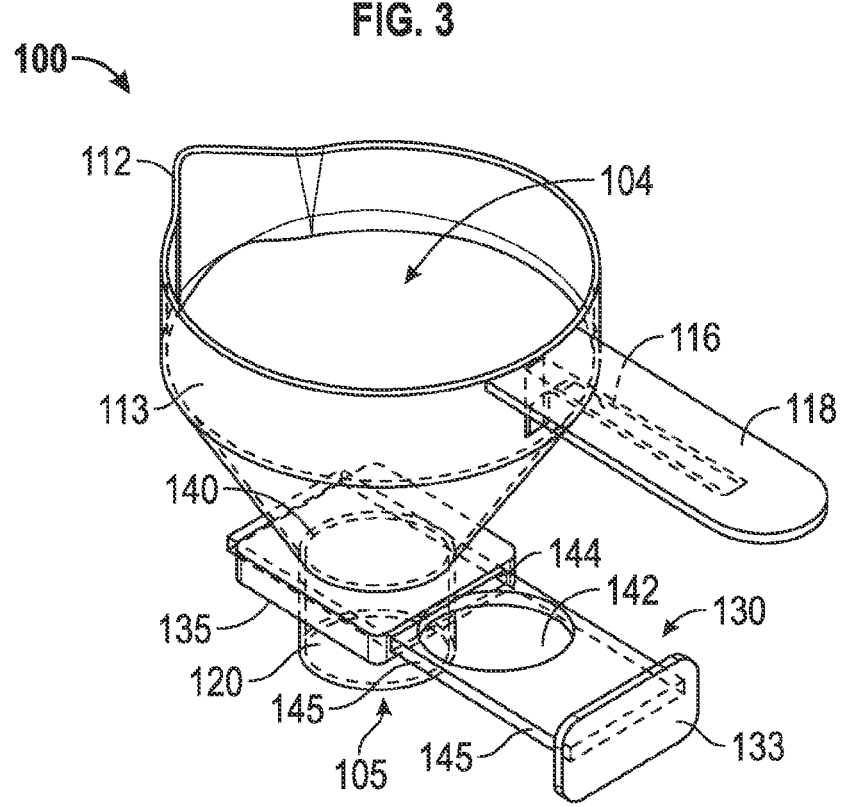
FIG. 4 is a prospective view illustrating an inner mechanism of a multifunction transfer device, in accordance with various embodiments.
Figure 5:
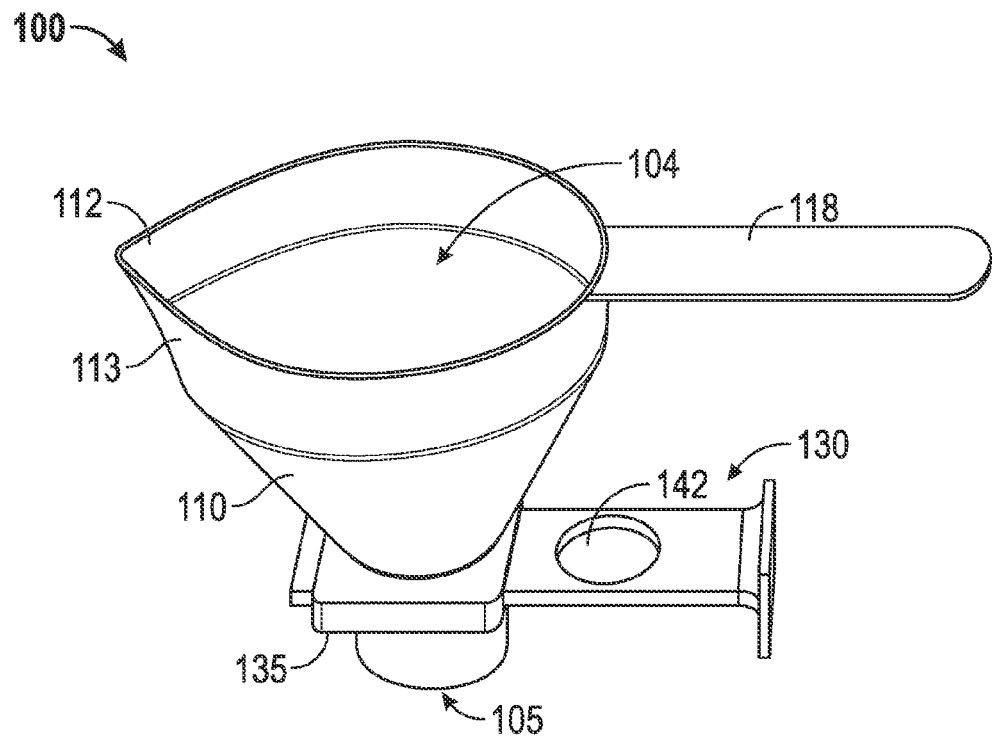
FIG. 5 is a top prospective view illustrating a multifunction transfer device in a closed position, in accordance with various embodiments.
Figure 6:
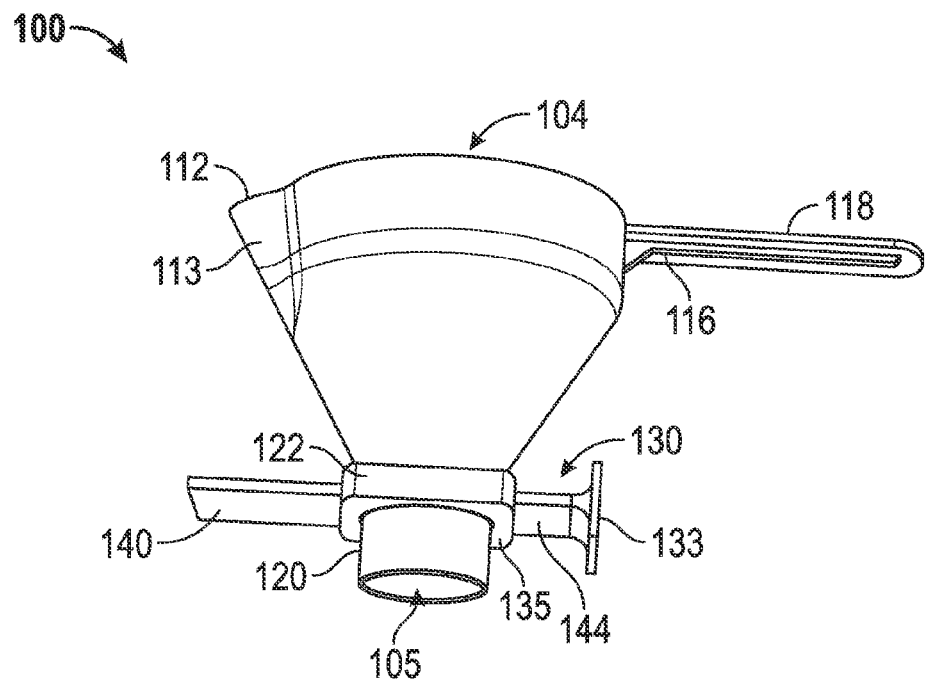
FIG. 6 is a bottom prospective view illustrating a multi-function transfer device in an open position, in accordance with various embodiments.

The following description is merely exemplary in nature and is in no way intended to limit the various embodiments, their application, or uses. As used herein, the phrase "at least one of A, B, and C" should be construed to mean a logical (A or B or C), using a non-exclusive logical or. As used herein, the phrase "A, B and/or C" should be construed to mean (A, B, and C) or alternatively (A or B or C), using a non-exclusive logical or. It should be understood that steps within a method may be executed in different order without altering the principles of the present disclosure.

The drawings, described herein, are for illustrative purposes only of selected embodiments and not all possible implementations, and are not intended to limit the scope of any of the various embodiments disclosed herein or any equivalents thereof. It is understood that the drawings are not drawn to scale. For purposes of clarity, the same reference numbers will be used in the drawings to identify similar elements.

According to various embodiments, a multifunction transfer device can be used to transfer a known quantity of powder to a container holding a liquid, such as, for example, a bottle. In one embodiment, the multi-transfer device is used to measure the quantity of a fitness-type powder, such as for example, protein, whey, creatine, amino acids, and combinations thereof, and direct the measured amount of the power into a bottle containing a liquid, such as, for example, water to create a mixture. In one embodiment, the known quantity of powder is a flavoring product, such as, for example, Crystal Light®, Kool-Aid®, Gatorade®, Powerade®, and the like. In one embodiment, the known quantity of powder is a baby formula. The mixture can contain a known quantity of a desired ingredient, such as, for example, protein, whey, one or more amino acids, creatine, or any other desired compound.

According to various embodiments, a multifunction transfer device comprises a conical portion in communication with a chute. In various embodiments, the conical portion is coupled to a release mechanism which is coupled to the chute. In one embodiment, the release mechanism is in fluid communication with the conical portion in the chute. In one embodiment the release mechanism has an open position and a closed position. In various embodiments, the release mechanism can meter a flow of a material from the conical portion to the chute. In one embodiment the release mechanism can have a plurality of open positions, which meter the flow of the material at different rates. In various embodiments, the multifunction transfer device is configured to be held in one hand and to operate the release with the same one hand.

In various embodiments, a multi-function transfer device comprises an open ended conical portion, a release mechanism coupled to an open-end having a smaller diameter, and a chute coupled to the release mechanism. In one embodiment, a multifunction transfer device comprises a handle coupled to an exterior of the open-end conical portion. In one embodiment, the conical portion comprises an annular portion integrated to an open end having a larger diameter. In one embodiment, the multifunction transfer device comprises a spout. The spout can be integrated into the conical portion, integrated into the annular portion, or integrated into the conical portion and the annular portion. In one embodiment, the conical portion comprises a known volume and at least one graduation can be included on the conical portion to indicate a measurement within the known volume. In one embodiment, at least one of the conical portion and the annular portion comprise at least one graduation to indicate one or more measurements within the known volume.

According to various embodiments, the release mechanism can comprise support, which may, for example, couple to a mouth of a liquid container. In various embodiments, the release mechanism comprises an open position and a closed position. In one embodiment, the release mechanism can be moved from the open position to the closed position or vice versa through the use of a grip or a handle. In one embodiment, the release mechanism can be moved from an open position to a closed position or vice versa through the use of a button. In various embodiments, the release mechanism has a member to hold the release in either an open position or a closed position. In various embodiments, the release mechanism can include gaskets, seals, a sleeve, or any other mechanical sealing device functional to seal a material, such as, for example, a liquid, held in the conical portion from seeping through the release when the release is in a substantially closed position.

According to various embodiments, a method can include placing the multifunction transfer device into a container containing a powder or a granular material; scooping a portion of the powder or granule material into the device; moving the loaded device; coupling a bottom portion of the device into the mouth of a liquid container; and releasing the portion of the powder or granular material into the liquid container. In one embodiment, the method can include mixing the powder or granular material with the liquid in the container.

In one embodiment, the method can include measuring a dose of the powder or granular material within the multi-function transfer device. In one embodiment, the method can include discarding the powder or granule material in excess of the dose. In one embodiment, the method can include discarding the powder or granular material in excess through a bottom portion of the multifunction transfer device. In one embodiment, the method can include moving a release mechanism, discarding the excess powder or granule material through the release mechanism, closing the release mechanism, and confirming measurement of the dose. In one embodiment, the method can include filling a volume of the multi-function transfer device with the powder or granular material to a graduation scribed onto multifunction transfer device.

Moving to FIGS. 1-6, in various, embodiments, multifunction transfer device 100 comprises a conical portion 110, a chute 120, and a release 122. Multifunction transfer device 100 has a top 101 and a bottom 102. Conical portion 110 is open-ended and is configured with an open-end at top 101 which is larger than an open-end located towards bottom 102 and distal to the open-end at top 101. Multifunction transfer device 100 comprises a volume 104 within conical portion 110.

Multifunction transfer device 100 comprises an outlet 105 through chute 120. In one embodiment, multifunction transfer device 100 can comprise an annular portion 113 coupled to the top of conical portion 110. Annular portion 113 can increase volume 104 of the multifunction transfer device 100. Annular portion 113 is open-ended and has a diameter substantially similar to the open-end at top 101 of conical portion 110.

In various embodiments, multifunction function transfer device 100 can comprise a handle 118 and may comprise a support 116 coupled between handle 118, which may be coupled to or integrated with an exterior portion of at least one of conical portion 110 and annular portion 113. In one embodiment, handle 118 and support 116 are coupled to annular portion 113. In various embodiments, handle 118 may be shaped to ergonomically fit in a hand. For example, handle 118 may be curved, tilted, pitched, rounded, looped, or molded, combinations thereof, and the like, to improve fit in hand and/or enhance single-handed operation of multifunction transfer device 100.

In one embodiment, multifunction transfer device 100 can comprise a spout 112, which can be coupled to or integrated with at least one of conical portion 110 and annular portion 113. In one embodiment, spout 112 is integrated into the annular portion of 113. In one embodiment, spout 112 is configured to scoop and capture a powder or a granular material trapped in a corner of a container holding the powder or the granular material.

In various embodiments, multifunction transfer device 100 can comprise at least one graduation 115. As will be apparent to those skilled in the art, graduation 115 may be a line, which is printed, lithographed, penned, scribed, painted, or the like, unto the least one of conical portion 110 and annular portion 113. Graduation 115 can be placed on multifunction transfer device 100 to indicate a volume that is equal to a dose that is one serving of a material. As will be apparent to those skilled in the art, a plurality of graduations 115 may be placed on multifunction device 100 to indicate a variety of serving sizes of the material. For example, a plurality of graduations 115 may include a first graduation 115 to indicate a dose that is one serving of the material and a second a second graduation 115 to indicate a dose that is two servings of the material. Another example, a plurality of graduations 115 may include the first graduation 115 to indicate a dose used for a predetermined amount of liquid, such as for example 8 ounces, a second graduation 115 to indicate dose for predetermined amount of liquid, such as, for example, 12 ounces, and a third graduation 115 to indicate a dose for predetermined amount of liquid, such as, for example, 16 ounces. For example, a plurality of graduations 115 may include the first graduation 115 to indicate a dose of a first material and a second a second graduation 115 to indicate a dose of a second material.

Of course, graduation 115 may be at top 101 of at least one of conical portion 110 and annular portion 113. In other words, multifunction transfer device 100 may be designed specifically for one dose when a material completely fills volume 104. As will be apparent to those skilled in the art, graduation 115 may indicate a volume equivalent of the specified weight of a dose. In various embodiments, multifunction transfer device 100 can be constructed with transparent or semi-transparent material and configured with one or more graduations 115. For example, multifunction transfer device 100 and configured to be transparent or semi-transparent and configured with a plurality of graduations 115 can be utilized to function as a measuring cup.

In various embodiments, chute 120 is configured as a substantially open-ended cylinder. However, chute 120 can be tapered having a smaller diameter at bottom 102, which may be advantageous for use with a plurality of mouth (opening) sizes of a bottle. Chute 120 is coupled to release 122. Chute 120 comprises outlet 105 at bottom 102 of multifunction transfer device 100. In various embodiments, release 122 controls the flow of material between conical portion 110 and chute 120. In one embodiment, material held within volume 104 of conical portion 110 can be freed by release 122, transferred through chute 120 and discarded through outlet 105.

In various embodiments, multifunction transfer device 100 can comprise rest 135. In one embodiment rest 135 is coupled to bottom of release 122. Rest 135 can control position of multifunction transfer device 100 above mouth of container 160. In various embodiments, rest 135 couple to top of mouth of container 160, which enables the holding of device 100 and the movement of release 122 by the use of only one hand.

According to various embodiments, release 122 comprises an open position and a closed position. Release 122 can comprise plug 140 and opening 142. In one embodiment, plug 140 and opening 142 are positioned on guide 130 which is linearly movable through slot 144 of release 122. Guide 130 can further comprise grip 133 located on an end of guide 130 that is closest to handle 118. Grip 133 can be useful for moving release 122 from a closed position to an open position with the same hand is holding handle 118. In one embodiment, release 122 further comprises a bias member (not shown), such as, for example, a spring, configured to assist in moving guide 130 from a closed position to open position. In various embodiments, release 122 further comprises a lock member 145, which may be employed to lock release 122 in either an open position or a close position. Lock member 145 may employ any mechanical mechanism useful to lock guide 130 in a position and can include, for example, but is not limited to, a slot, an indentation, a bump, a button, a catch, a pin, combinations thereof, and the like.

As shown in the FIGS. 1-6, release 122 is configured with plug 140 positioned distal to grip 133. In this configuration, guide 130 is pushed into slot 144 moving opening 142 into position below conical portion 110 for the open position. However, release 122 can be configured such that opening 142 is positioned distal to grip 133, which is not illustrated in the figures, as disclosed herein. In this alternative configuration, guide 130 is pull through slot 144 moving opening 142 into position below conical portion 110 for the open position.

Figure 7:
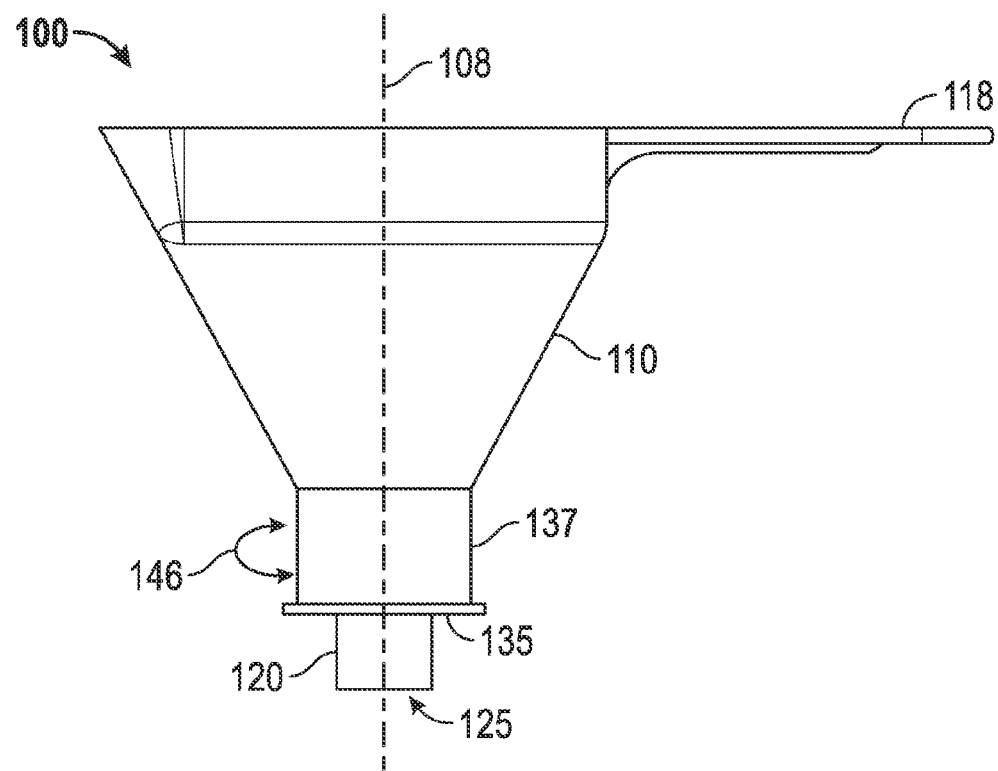
FIG. 7 is a side view illustrating a multifunction transfer device, in accordance with alternative embodiments.
Figure 8:
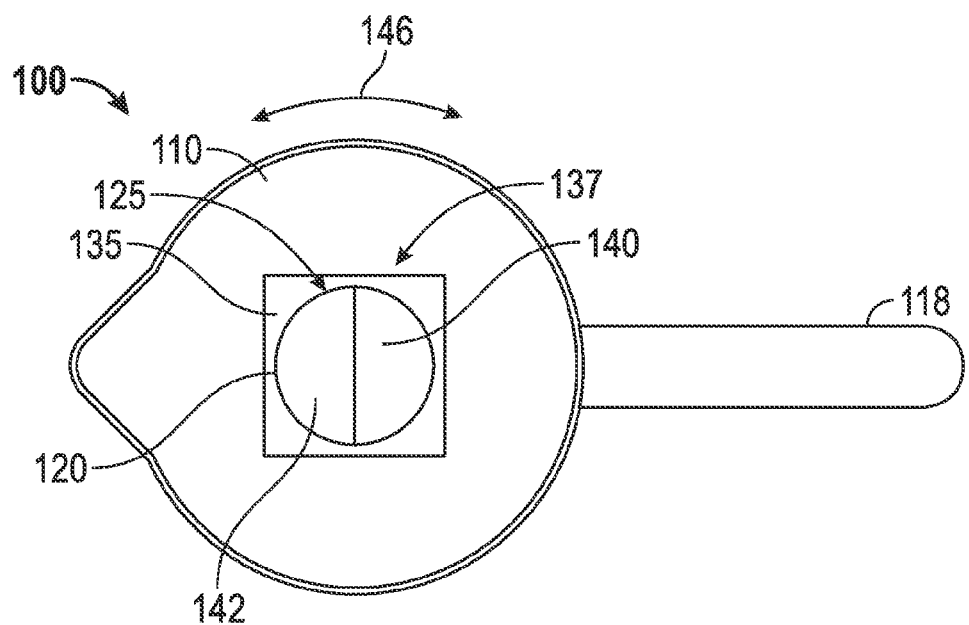
FIG. 8 is a bottom view illustrating a multifunction transfer device, in accordance with alternative embodiments.

Turning to FIGS. 7 and 8, an alternative embodiment of release 137 is illustrated. As described herein, release 137 is essentially equivalent to release 122 in regards to the methods described herein and the coupling of release 137 in multifunction transfer device 100. In various embodiments, release 137 has a movement 146 which is substantially rotational around a central axis 108 of multifunction transfer device 100. Release 137 is rotated from a closed position to an open position. As illustrated in FIG. 8, release 137 is an open position having opening 142 and plug 140. A second half of plug 140 (not shown) is stacked above plug 140 and upon rotation is moved over opening 142 to seal outlet 105 for the closed position.

Figure 9:
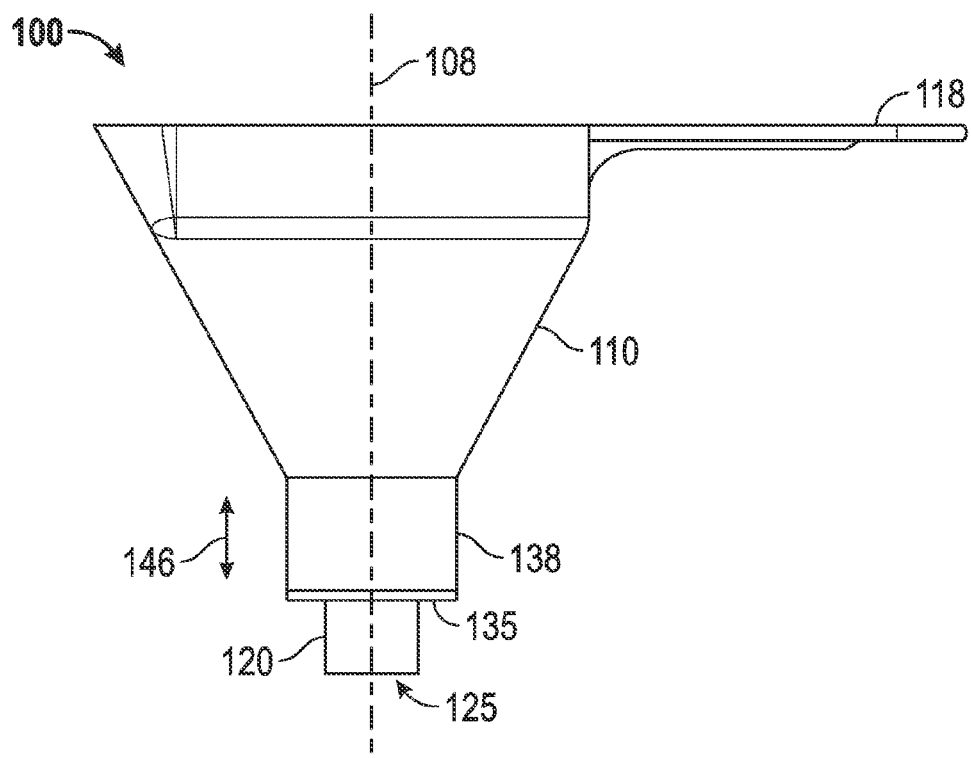
FIG. 9 is a side view illustrating a multifunction device, in accordance with alternative embodiments.
Figure 10:
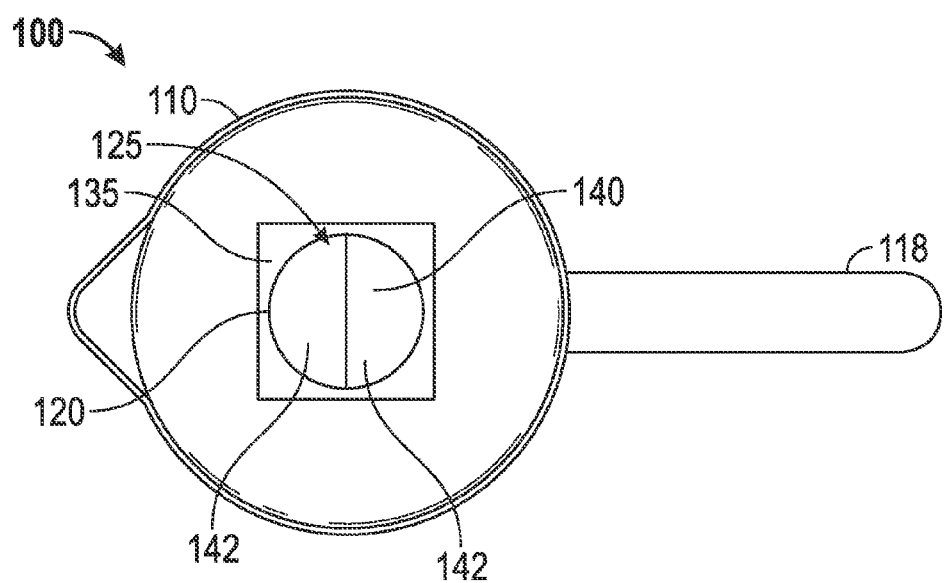
FIG. 10 is a bottom view illustrating a multi-function transfer device, in accordance with alternative embodiments.

Now turning to FIGS. 9 and 10, another alternative embodiment of release 138 is illustrated. As described herein, release 138 is essentially equivalent to release 122 and release 137 in regards to the methods described herein and the coupling of release 138 in multifunction transfer device 100. In various embodiments, release 138 has movement 146 which is substantially parallel with central axis 108 of multifunction transfer device 100. Release 138 is pushed down to rotate plug 140 from a close position to an open position. As illustrated in FIG. 10, release 138 is an open position having opening 142 and plug 140. Plug 140 is pivotally attached to chute 120 and upon pressure to push release 138 downward, plug 140 rotates from a close position to an open position. Pulling release 138 upward can rotate plug 140 from an open position to a closed position to seal outlet 105. In one embodiment, release 138 can comprise a bias member which is controlled by a button (not shown). In this embodiment, release 138 can be moved from a closed position to an open position by the press of the button which allows the bias member to move plug 140. The bias member can be reset such that plug 140 is in the closed position by pushing release 138 upward until the button is reset.

As will be appreciated by those skilled in the art, multifunction transfer device 100 can be made of any of a variety of materials. In various embodiments, multifunction transfer device 100 and comprise, for example, but not limited to, plastic, resins, polyesters, polymeric materials, metal, foam, biodegradable components, combinations thereof, and the like. In one embodiment, multifunction transfer device 100 is manufactured using substantially clear or semi-transparent materials. In one embodiment, multifunction transfer device 100 is manufactured using substantially opaque materials. In one embodiment, multifunction transfer device 100 is manufactured using a combination of substantially clear or semi-transparent materials and opaque materials. For example, multi-functioned transfer device 100 can be manufactured to have a substantially clear or semi-transparent conical portion 110 and to have an opaque release 122 and guide 130. In this example, chute 120 can be manufactured from any of substantially clear materials or semi-transparent materials or opaque materials. In this example, comical portion 110 can include one or more graduation 115 which may be read through the substantially clear or semi-transparent comical portion 110.

Figure 11:
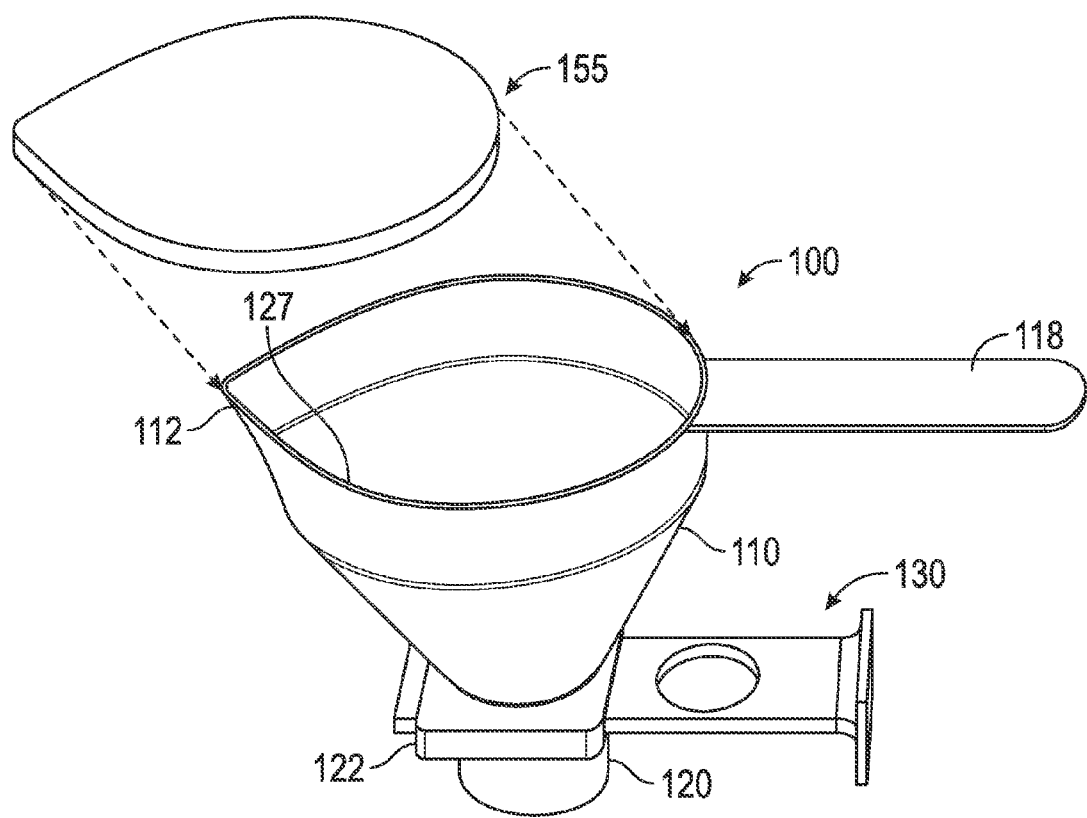
FIG. 11 is a side view illustrating a multifunction device and a lid, in accordance with various embodiments

Moving to FIG. 11, a system for transferring the material to be mixed with a liquid is illustrated. According to various embodiments, system can include multifunction transfer device 100 and lid 125. In the system, multifunction transfer device 100 further comprises lip 127 which is configured to couple to lid 125. In various embodiments, lid 125 can be removeably coupled to multifunction transfer device 100 to seal a material within volume 104 of multifunction transfer device 100.

Figure 12:
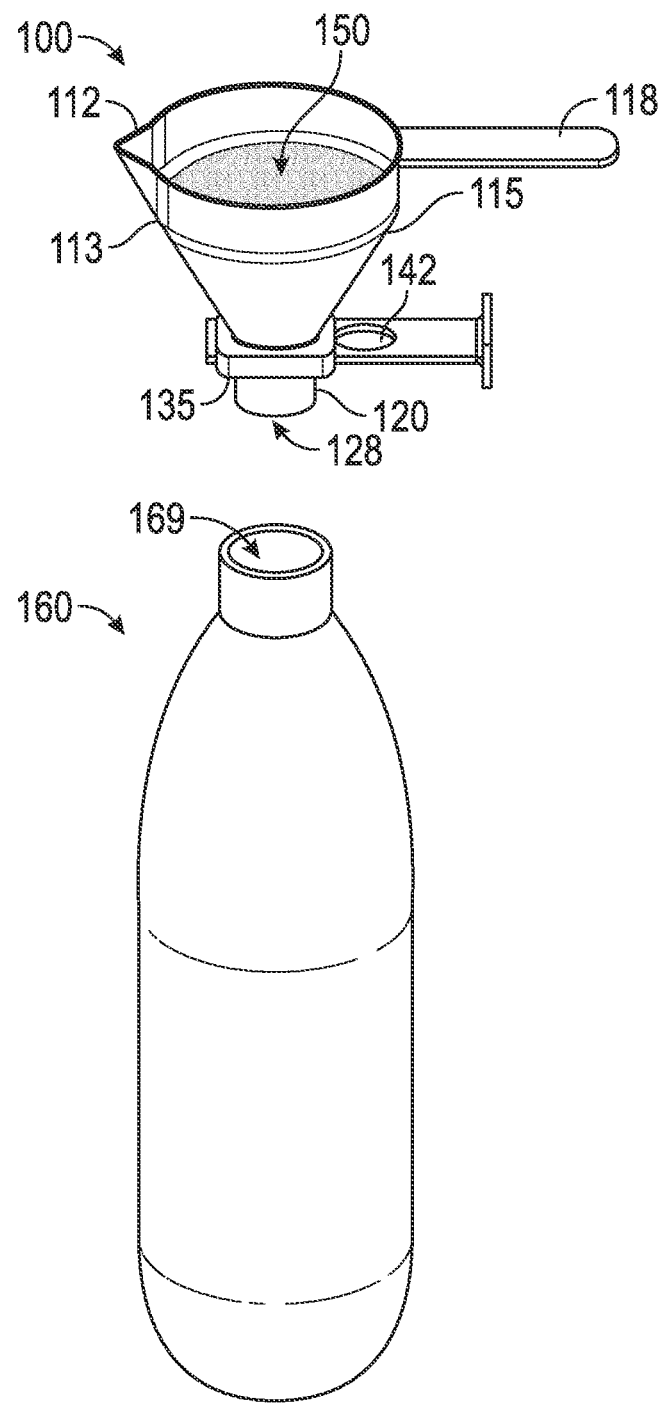
FIG. 12 is a partial diagrammatic illustrating a step of a method of use, in accordance with various embodiments.
Figure 13:
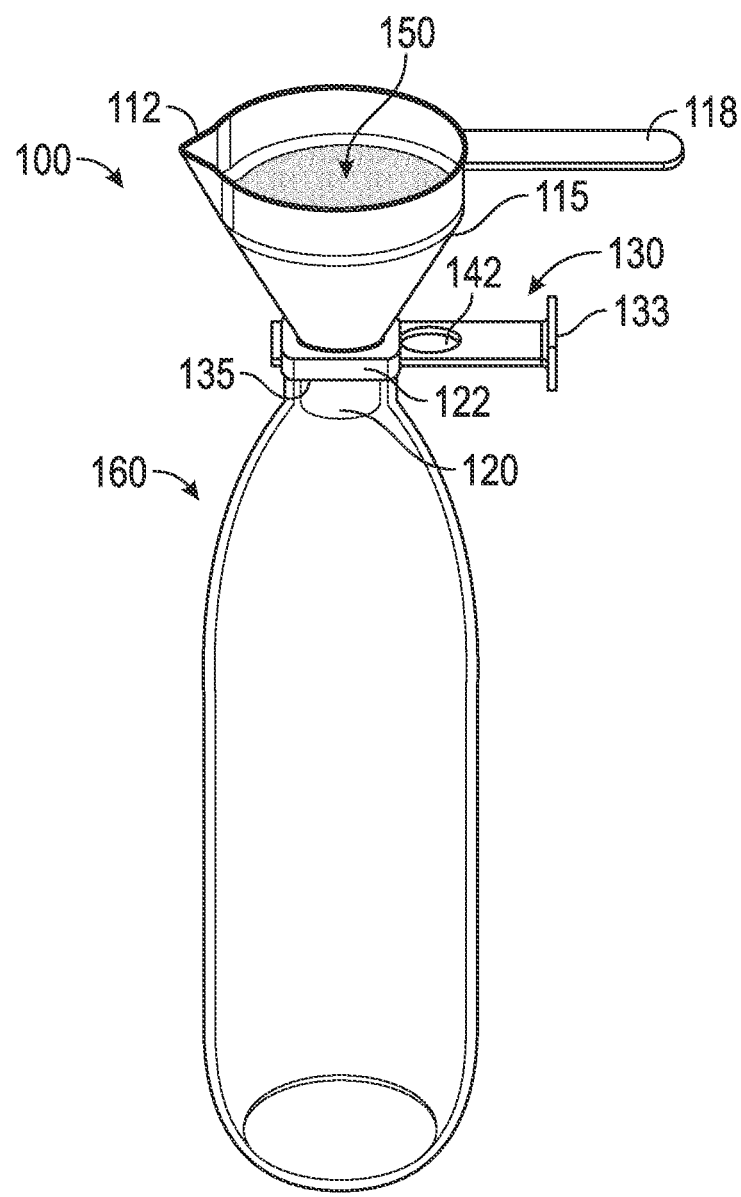
FIG. 13 is a partial diagrammatic illustrating a second step of a method of use, in accordance with various embodiments.
Figure 14:
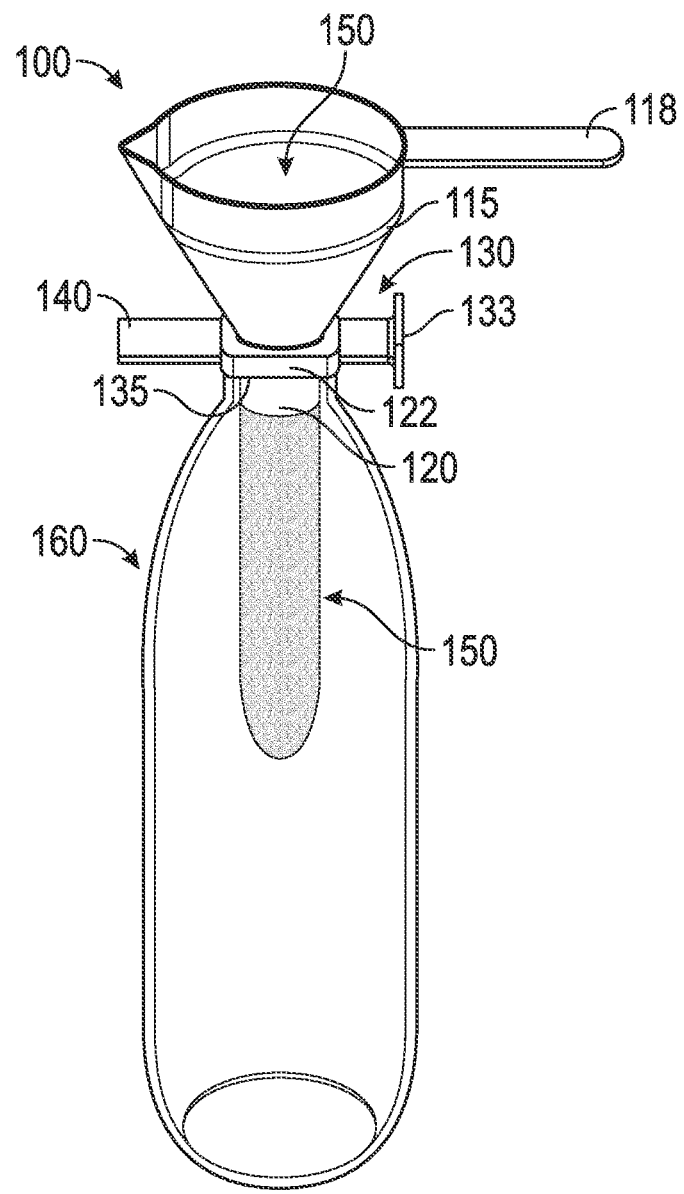
FIG. 14 is a partial diagrammatic illustrating a third step of a method of use, in accordance with various embodiments.

With reference to FIGS. 12-14, examples of methods of use are illustrated. In various embodiments, methods, disclosed herein, can be completed using only one hand. In one embodiment, a method of use can include placing the multifunction transfer device 100 into a container containing material 150; scooping a portion of material 150 into the device 100; moving the loaded device 100; a bottom portion of the device 100 into the mouth 169 of a liquid container 160; and releasing material 150 into the liquid container 160. In one embodiment, the method can include mixing material 150 with a liquid 170 held within the liquid container 160. In one embodiment, the method can include measuring a dose of material 150 within the multi-function transfer device 100. In one embodiment, the method can include discarding material 150 in excess of the dose. In one embodiment, the method can include discarding material 150 in excess through outlet 105 of the multifunction transfer device 110. In one embodiment, the method can include moving release 122, discarding the excess material 150 through release 122, and closing release 122. In one embodiment, the method can include filling volume 104 of multi-function transfer device 100 with material 150 to a graduation 115 scribed onto multifunction transfer device 100.

Figure 15:
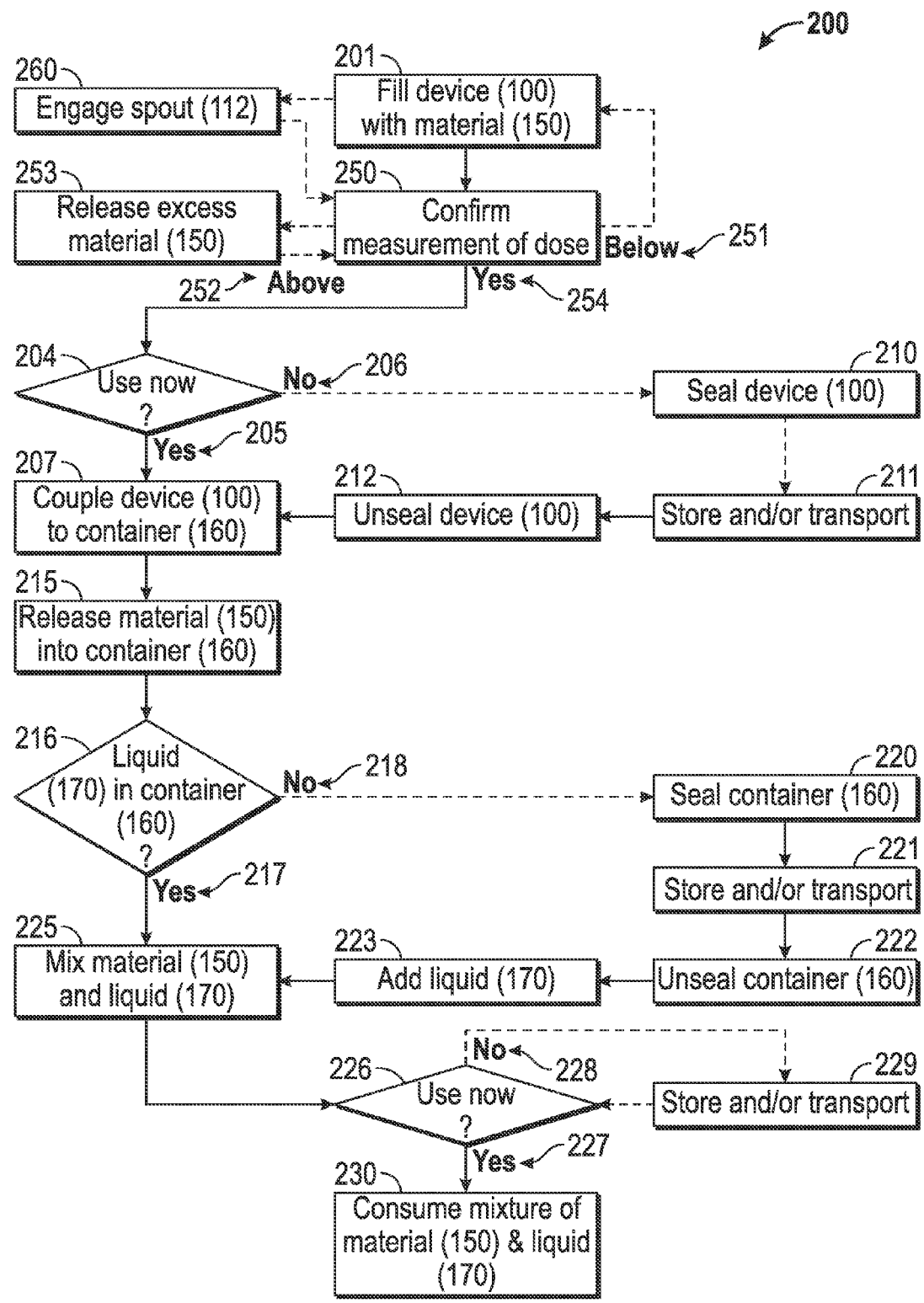
FIG. 15 is a flow chart illustrating methods of use, in accordance to various embodiments.

Referring now to FIG. 15, a flowchart illustrating various methods 200 is presented. In step 201, multifunction transfer device 100, as described herein, can be filled with material 150. In one embodiment, multifunction transfer device 100 may be placed in a container filled with material 150 and use to scoop material 150 out of the container. The question 204 is asked whether material 150 is to be used now. If the answer is no 206, go to step 210 which seals device 100 with lid 125. In step 211, sealed device 100 can be transported and/or stored for future use. Once the material is to be used, step 211 unseals device 100 then method moves to step 207. If the answer is yes 205, the next step 207 is to couple device 100 to container 160. In step 215, material 150 is released into container 160. The question 216 is asked whether liquid 170 is in container 160. If the answer is no 218, step 220 seals container 160. In step 221, container 160 can be stored and/or transported. In step 222, container is unsealed and in step 223 liquid 170 is added to container 160 then method moves to step 225. If the answer is yes 225, mixes material 150 with liquid 170. Once the material 150 and liquid 170 are mixed a question 226 is asked whether to use now. If the answer is no 228, the mixture can be stored or transported in step 229. If the answer is yes 227, the mixture of material 150 and liquid 170 is consumed in step 230.

In various embodiments, optional steps may be included in method 200. For example after step 201, in which device 100 is filled with material 150, the next step can be the confirming a measurement of material 150 is accurate as of dose which is the question 254. If the answer is yes 254, the method moves to step 204, which is the question 204 of whether to use now, as described here. If the answer is below measurement 251, the method cycles back to step 201 to fill more material 150 into device 100. If the answer is above 252, move to step 253 to release excess material 150 through outlet 105 and then move back to the move back to question 250 once again.

Another option, in filling device 100 in step 201 can include step 260 which engages spout 112 to capture material 150 which may be trapped in a corner of a container holding material 150. After step 260 the method can move to step 204 which is a question 204 whether to use now, as described herein. However, optionally step 260 can move to question 250 to confirm measurement, as described here.

In various embodiments, multifunction transfer device 100 may be part of the kit. For example, a kit can include multifunction transfer device 100 and lid 125. The kit can further include or be integrated with a container holding the material which may be a granular or powder, such as, for example, a liquid flavoring, a fitness or body building powder, a sports drink powder, a baby formula, or the like. The kit should include the multifunction transfer device 100 and lid 125 inside the container or packaged on the outside of the container.

Another example, a kit can include multifunction transfer device 100 in a semi-sterile package and one or more containers of baby formula. This kit can further include a holder for the device 100 which can keep the device from touching any contaminants in the surrounding environment. This kit can include instructions for use of the multi-function transfer device 100 with baby formula and such instructions may be in paper form, a digital format, and/or presented as video. This kit can include a plurality of graduations 115 on substantially clear or semi-transparent multifunction transfer device 100, which are configured for a variety of measurements or doses that correspond with different volumes of liquid used to make the baby formula.

In the foregoing specification, the invention has been described with reference to various embodiments. Modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus or system claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, system, composition or apparatus that comprises a list of elements does not include only those elements recited, but may also include other elements not expressly listed or inherent to such process, method, article, system, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A multifunction transfer device, comprising:
an open-ended conical portion having a larger diameter at a top open-end than at a bottom open-end and an annular portion on the top open-end;
a spout intergrated into the annular portion and conical portion, wherein the spout is configured to capture a material trapped in a corner of a container holding the material;
a release coupled to the bottom open-end of the conical portion and configured to move from a closed position to an open position and to move from the closed position to the open position in a substantially linear motion;
a grip perpendicularly integrated into the release and having a first portion of the grip above the release and a second portion of the grip below the release;
a planar rest integrated to a bottom of the release and configured to hold the device above a liquid container; and
an open-ended cylinder coupled to the release below the planar rest and configured for fluid communication between the conical portion and the liquid container.

2. The device according to claim 1, further comprising a handle coupled to an exterior of one of the conical portion or the annular portion.

3. The device according to claim 1, further comprising at least one graduation configured to indicate a measurement of the material contained in a volume within the conical portion.

4. The device according to claim 1, further comprising a lid configured to couple to a rim around a circumference of the annular portion of the conical portion and configured to seal a volume of the conical portion.

5. The device according to claim 1, wherein
the release is a slideable release configured to move from the locked closed position to the open position and to move from the closed position to the open position in a substantially linear motion; and
the planar rest is integrated to a bottom open-end of the conical portion and comprise a slot configured to hold the slideable release, wherein a bottom surface of the planar rest is flat and is configured to hold the device above the liquid container.

6. A system for transferring a material for mixture with a liquid, the system comprising:
a multifunction transfer device comprising:
an open-ended conical portion having a larger diameter at a top open-end than a bottom open-end and an annular portion on the top open-end;
a spout integrated into the annular portion and conical portion, wherein the spout is configured to capture a material trapped in a corner of a container holding the material;
a lip integrated to the exterior of the annular portion;
a release coupled to the bottom open-end of the conical portion and configured to move from a locked closed position to an open position;
a grip integrated into the release;
a planar rest integrated to a bottom of the release and configured to hold the transfer device above a liquid container; and
an open-ended cylinder coupled to the release below the planar rest and configured for fluid communication with the conical portion; and
a lid configured to couple to the lip and to seal a volume of the conical portion.

7. The system according to claim 6, wherein the release is configured to move from the closed position to the open position in a substantially rotational motion around a center axis of the device.

8. The according to claim 6, wherein the release is configured to move from the closed position to the open position in a linear motion substantially parallel to a center axis of the device.

9. The system according to claim 6, further comprising the liquid container.

10. The system according to claim 6, further comprising at least one graduation configured to indicate a measurement of the material contained in a volume within the conical portion.

11. The system according to claim 6, wherein
the release is a slideable release configured to move from a locked closed position to an open position and to move from the closed position to the open position in a substantially linear motion; and
the planar rest is integrated to a bottom open-end of the conical portion and comprising a slot configured to hold the slideable release.

12. The system according to claim 11, wherein the grip is perpendicularly integrated into the slideable release and having a first portion of the grip above the slideable release and a second portion of the grip below the slideable release.

13. A multifunction transfer device, comprising:
an open-ended conical portion having a larger diameter at a top open-end than at a bottom open-end and an annularportion on the top open-end;
a spout integrated into the annularportion and the conical portion, wherein the spout is configured to capture a material trapped in a corner of a container holding the material;
a planar rest integrated to a bottom open-end of the conical portion and comprising a slot configured to hold a release, wherein a bottom surface of the planar rest is fiat and is configured to hold the device above a liquid container;
a slideable release coupled to the bottom open-end of the conical portion and configured to move from a closed position to an open position and to move from the closed position to the open position in a substantially linear motion within the slot;
a grip perpendicularly integrated into a distal end of the slideable release and having a first portion of the grip above the slideable release and a second portion of the grip below the slideable release; and
an open-ended cylinder coupled to the release below the planar rest and configured for fluid communication between the conical portion and the liquid container.

14. The device according to claim 13, further comprising a handle coupled to an exterior of one of the conical portion or the annular portion.

15. The device according to claim 13, further comprising at least one graduation configured to indicate a measurement of the material contained in a volume within the conical portion.

16. The device according to claim 13, further comprising a lid configured to couple to a rim around a circumference of the annular portion of the conical portion and configured to seal a volume of the conical portion.

* * * * *